United States Patent [19]

Badalich et al.

[11] 4,009,952
[45] Mar. 1, 1977

[54] INTERMITTENT ROTARY MOTION DEVICE

[75] Inventors: Frank C. Badalich, Chicago; George J. Pawl, Norridge, both of Ill.

[73] Assignee: Bell & Howell Company, Chicago, Ill.

[22] Filed: Jan. 9, 1975

[21] Appl. No.: 539,875

[52] U.S. Cl. .......................... 353/109; 353/DIG. 2
[51] Int. Cl.² ....................................... G03B 23/08
[58] Field of Search .............. 353/68, 109, DIG. 2

[56] References Cited

UNITED STATES PATENTS

| | | | |
|---|---|---|---|
| 771,828 | 10/1904 | Mead et al. | 353/109 |
| 1,617,642 | 2/1927 | Knott | 353/109 |
| 2,425,704 | 8/1947 | Nemeth | 353/DIG. 2 |
| 2,655,075 | 10/1953 | Lightburn et al. | 353/68 |
| 3,632,200 | 1/1972 | Frey | 353/109 |

Primary Examiner—Steven L. Stephan
Attorney, Agent, or Firm—John R. Hoffman; Robert J. Schneider; Roger M. Fitz-Gerald

[57] ABSTRACT

A film strip projector which is provided with synchronized audio accompaniment. A film strip is framed with respect to a projection aperture by a selectively operable framing device. Once the film strip is initially framed, the film strip is advanced frame by frame by a Geneva type film advance mechanism. The audio accompaniment is carried on a dual track audio tape, one track of which carries the audio message pertinent to a particular frame and the other track of which carries a control signal for the film drive mechanism. The Geneva type film drive mechanism comprises a pair of cooperating gears the second of which rotates only 90° for every 180° rotation of the first gear. The first gear automatically deenergizes the drive motor after rotation of approximately 180°.

12 Claims, 20 Drawing Figures

INTERMITTENT ROTARY MOTION DEVICE

BACKGROUND AND SUMMARY OF THE INVENTION

This invention relates generally to film strip projectors and more particularly to improvements in film strip projectors which are adapted for use with tapes which have recorded thereon audio messages which pertain to the visual content of the film.

Film strip projectors are widely used in the instructional field as well as in sales promotion and other fields. This media is especially suitable for such purposes in that it permits the presentation of selected illustrations for varying time periods depending upon their informational content and thus conserves the amount of film required. It will be appreciated that the simultaneous performance of a synchronized audio message greatly increases the interest and usefulness of the visual presentation.

The illustrated embodiment is particularly suited for the projection of 35mm film but lends itself to other sizes as well. However, a particular characteristic of 35mm film strip is that the development standards are not well formulated throughout the industry. In this respect, sprocket holes which are used for driving the film in the camera and in the projector are not consistently located at a predetermined spacing with respect to the individual frames or images on the film strip. This characteristic prevents the indexing of the film frames within a projector aperture by means of a simple original sprocket hole orientation. Therefore initial framing alignment must be manually accomplished. The film sprocket holes on a particular film strip are precisely located relative to the position of all of the film frames on that particular strip and therefore the film drive mechanism must be extremely accurate to insure consistent framing of the respective frames throughout the entire roll of film once initial framing is achieved.

A particular feature of the illustrated embodiment herein is the inclusion of a modified tape recorder which supplies audio messages related to the visual images being projected, as well as supplying control signals to the projector for automatically advancing the film strip, frame by frame, in synchronization with the audio format.

An object of the present invention is to provide a new and improved Geneva type mechanism which can be successively indexed and still maintain an accurate relative position without requiring the complexity and relative high cost of previous such devices.

Another object of the present invention is to provide a Geneva type drive mechanism which is particularly suited for 90° rotational indexing for use within a film strip projector.

DESCRIPTION OF THE PREFERRED EMBODIMENT

GENERAL

Figure 1:
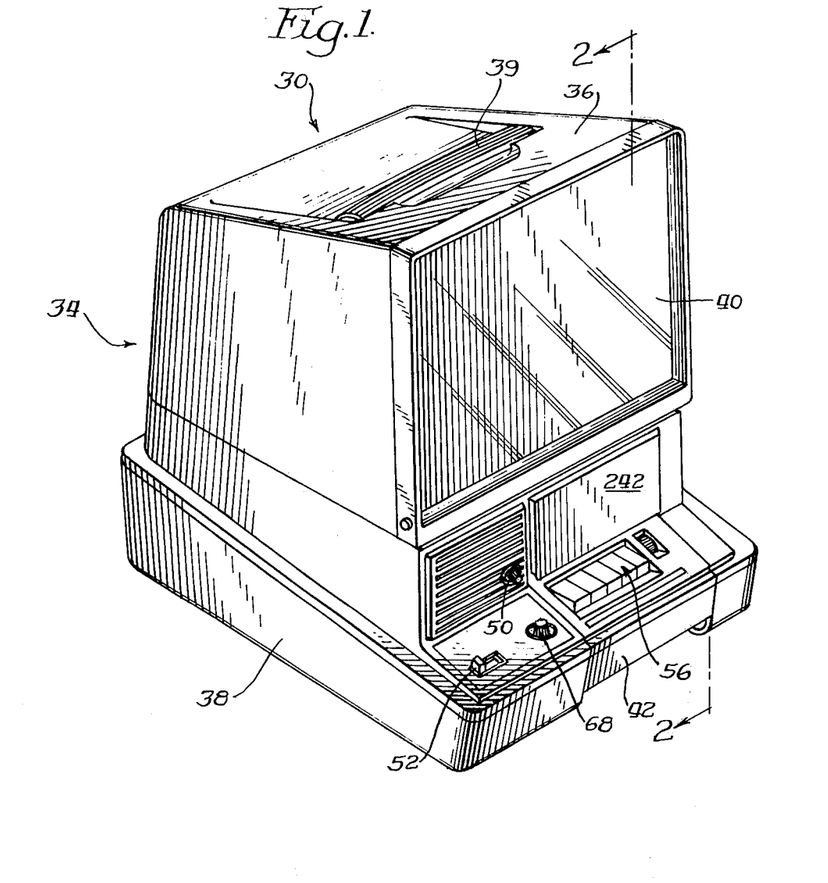
FIG. 1 is a front perspective view of a film strip projector contemplated by the present invention.

A general description of the operation of the interior screen film strip projector of the present invention will aid in understanding the operation and concepts utilized by the projector. The interior screen film strip projector, generally designated 30, is illustrated in FIG. 1. The projector 30 comprises a cabinet, generally designated 34, which includes a top cover 36 and a base 38. A handle 39 is mounted on the top of the cover 36 to facilitate carrying the projector 30. The front wall of the cover 36 comprises a rear projection screen 40 upon which visual images are projected from the rear or interior for viewing.

Mounted within the base 38 is a standard stereo or two track audio cassette tape recorder 42 which is modified slightly for use in the film strip projector of the present invention. A combination film strip and audio tape cartridge, generally designated 44 (FIG. 5), is loaded within the tape recorder 42 with the film strip positioned for feeding into the projector 30.

Figure 11:
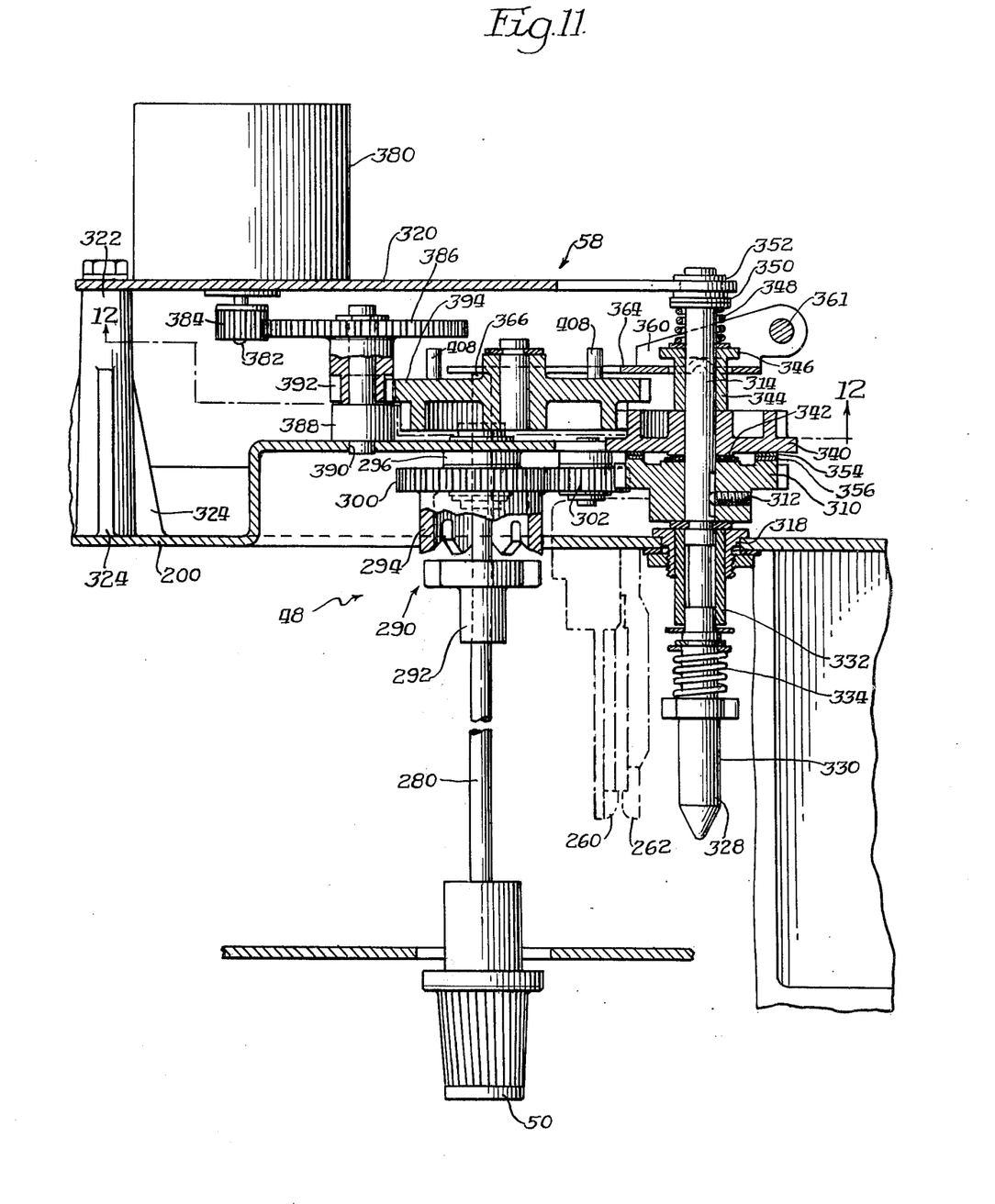
FIG. 11 is a top plan view of the film drive means of the present invention.

Upon loading of the combination cartridge 44, the first frame of the film strip is manually framed with respect to a projection aperture 46 by a selectively operable framing means, generally designated 48 (FIG. 11). The framing means 48 includes a manually operable framing knob 50 which extends through the front wall of the base to permit rotation thereof while the film strip is being viewed on the screen 40.

The film strip projector 30 is energized by throwing an off-on switch 52 on the front of the cabinet to the "on" position, causing the image of the frame centered in the projection aperture 46 to be projected on the screen 16. The tape recorder 42 is actuated by depressing one of a plurality of control buttons, generally designated 56, which starts the audio tape to be played. The tape recorder 42 provides audio accompaniment for the film strip by a first track carrying an audio message concerning a particular frame. The second track of the audio tape carries film advance signals for advancing the film strip through the projector. Upon the occurrence of a film advance signal, a film drive means, generally designated 58 (FIGS. 11 through 14), advances the film strip through the projection aperture 48 by a single frame. It should be noted that the audio tape drive is completely independent from the film strip drive means so that any length of audio tape relevant to a particular film strip frame may be played before the film strip is advanced to the next frame.

Figure 2:
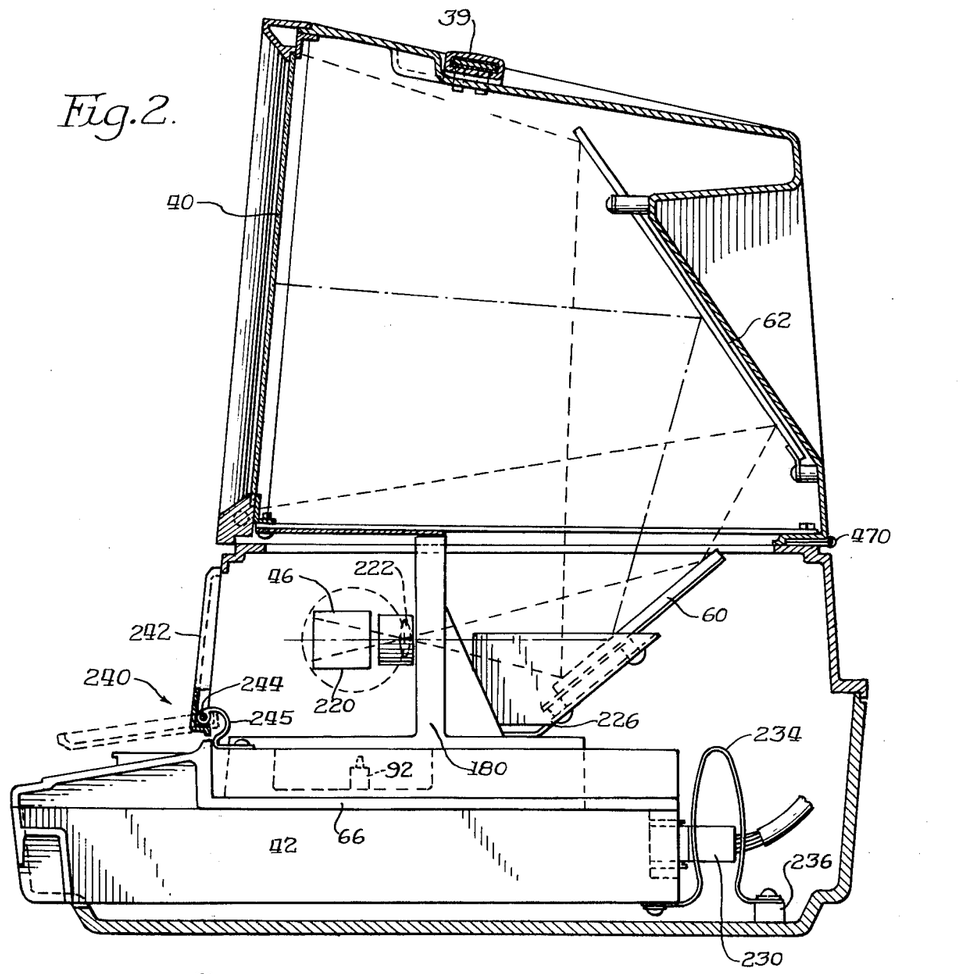
FIG. 2 is a vertical section, on an enlarged scale, of the film strip projector taken generally along the line 2—2 of FIG. 1.
Figure 3:
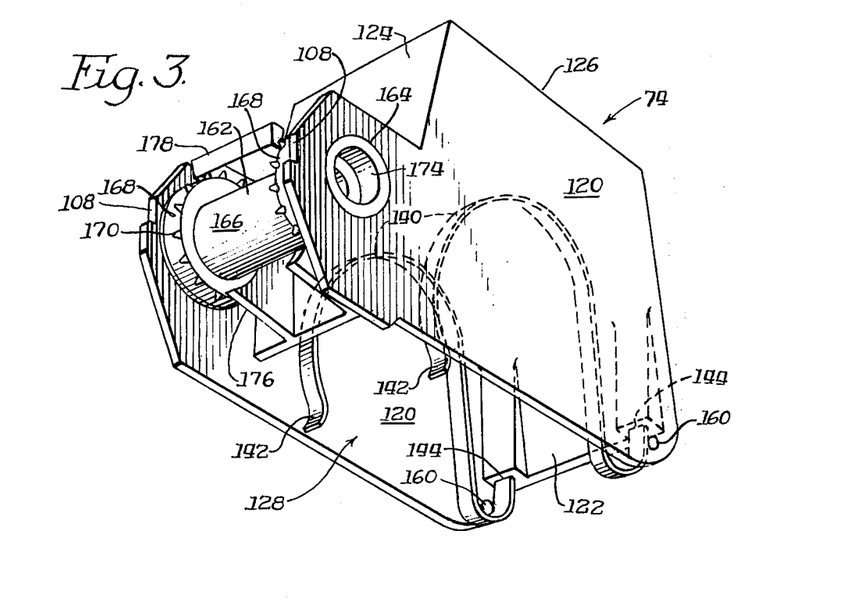
FIG. 3 is a perspective view of the cover of the film cartridge of the present invention.

The image from a single frame of the film strip is directed onto a first reflecting mirror 60 (FIG. 2). The reflecting mirror 60 then directs the image onto a second reflecting mirror 62 then reflects the image onto the back of the screen 40. The screen 40 is generally translucent, being made of frosted glass, plastic, or the like, which thereby provides a sharp, clear image for viewing from the front of the film strip projector 30.

The tape recorder 42 is slidably mounted in a drawer type arrangement on a pair of horizontal rails 66 so that it can be moved forward of the base 38 for loading of a cartridge 44 and then moved back into the position as shown in FIG. 1 for operation of the projector 30. Since it is desirable to prevent removal of the tape recorder 42 while a portion of the film strip is threaded through the projector, an interlock is provided to prevent tearing or jammng of the film. More particularly, an interlock release buttons 68 is mounted on the front of the base (FIG. 1) which releases the tape recorder for forward movement. However, the interlock prevents actuation of the button 68 in the event that film is threaded in the projector. Once the film is rewound into the cartridge 44 the interlock button 68 may be depressed and the recorder moved forward for removal of the cassette. Additionally, the film strip projector 30 includes various other operational features which will be described in detail hereinafter.

FILM STRIP AND AUDIO TAPE CARTRIDGE

Figure 4:
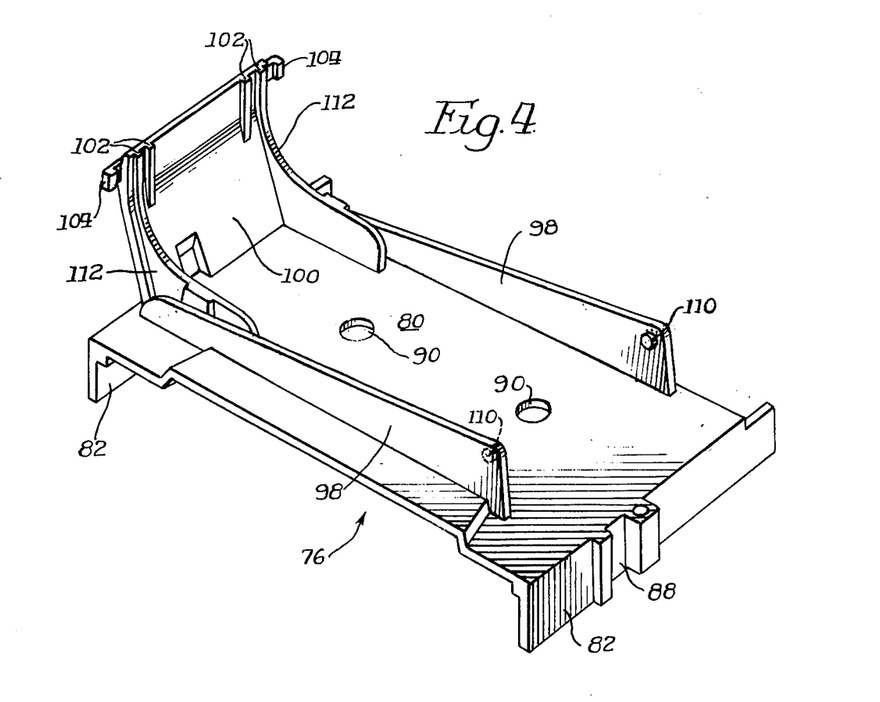
FIG. 4 is a perspective view of the base of the film cartridge of the present invention.
Figure 5:
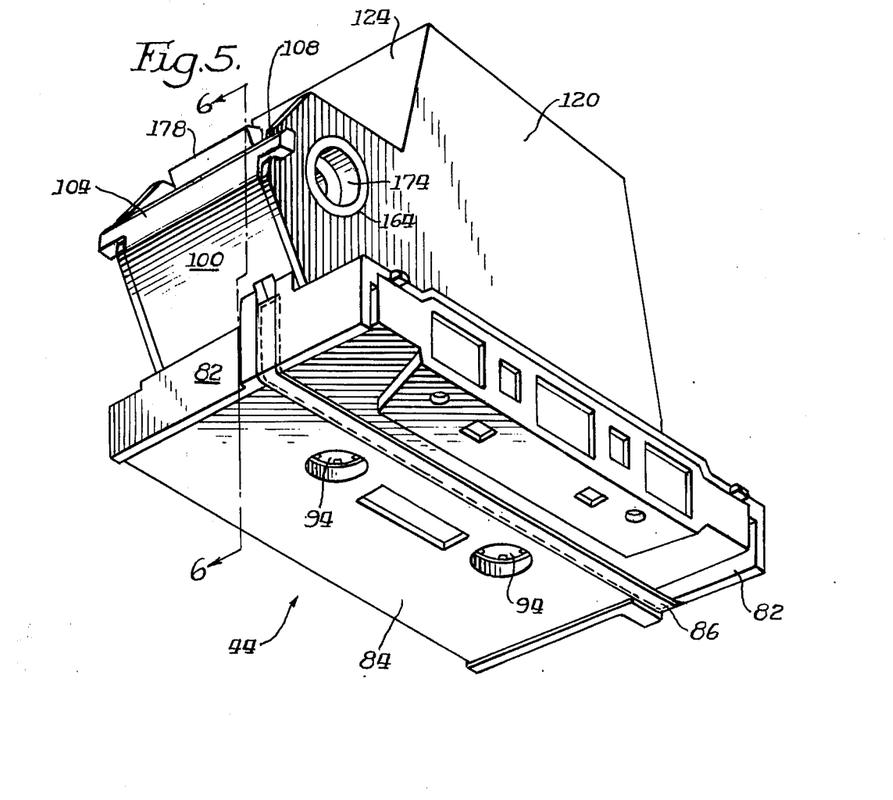
FIG. 5 is a perspective view of the assembled film strip cartridge including an audio tape cassette for use with the present invention.
Figure 6:
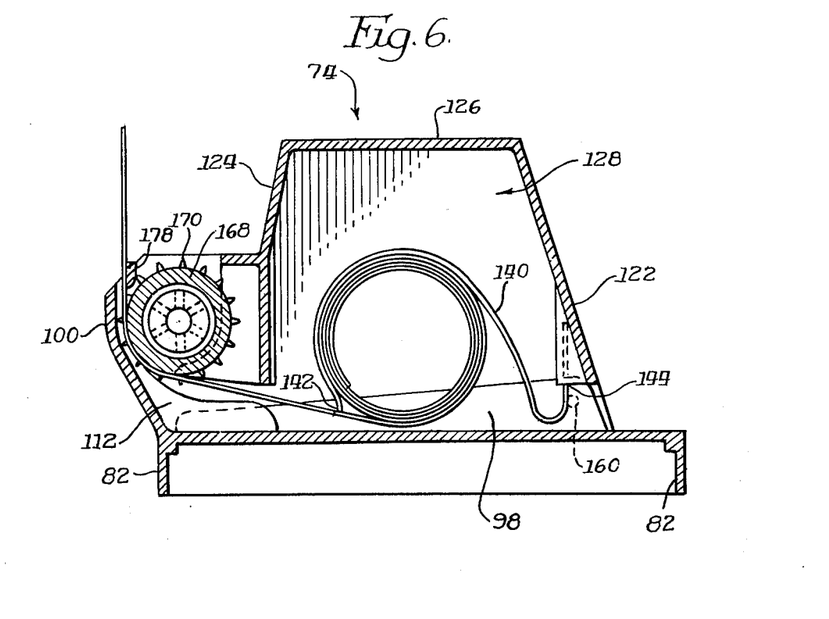
FIG. 6 is a vertical section of the film cartridge taken generally along the line 6—6 of FIG. 5.

The cartrige 44 used in the projector 30 is particularly illustrated in FIGS. 3 through 6 and includes a cover portion, generally designated 74 (FIG. 3) and a base portion, generally designated 76 (FIG. 4). The base 76 includes a generally planar chassis 80 which includes a pair of depending parallel cassette retaining side walls 82 which cooperate to securely receive a conventional audio tape cassette 84 (FIG. 5). To insure that the cassette 84 is held in position, a retaining spring 86 engages a pair of spring guides 88 defined by the outward configuration of the cassette retaining walls 82. The chassis 80 of the base 76 is provided with a pair of clearance apertures 90 which allow the audio tape drive spindles 92 (FIG. 2) to fully engage the drive spools 94 of the cassette, as seen in FIG. 5.

The upper surface of the chassis 80 carries a pair of spaced apart film guide rails 98. The rails 98 are secured on one end to a generally curved front wall 100. The inwardly disposed surface of the front wall 100 carries two spaced pairs of sprocket guides 102. Each pair is formed adjacent one edge of the front wall 100 and serve to assure positive drive of the film strip, as will further be described with reference to the cover 74. The outer sprocket guides 102 extend into a curved film guide flanges 112 which prevent disengagement of the film strip from the sprocket 162. When the end of the film strip approaches the sprocket, as the film strip is rewound into the cartridge, the film will flex downwardly against the top of the film guide flange 112 and disengage the sprocket teeth 170. The sprocket holes cam off of the sprocket teeth to prohibit total rewinding of the film strip. When feeding the film strip into the projector at the start of a film strip, the sprocket teeth 170 pull the film strip upwardly away from the guide flanges 112 for full sprocket teeth engagement. A pair of hinge pins 110 are formed on the flanges 98 at the opposite ends thereof from the front wall 100 for cooperating engagement with the cover 74.

The film cartridge cover 74 comprises a pair of side walls 120, a rear wall 122, a front wall 124 and a top wall 126 which define a film strip storage cavity, generally designated 128.

Positioned within the cover 74 and serving to maintain the film in proper relationship with respect to the cartridge is a film retaining means in the form of a pair of arcuately shaped resilient springs 140. The springs are fabricated from elongated metallic strips or other suitable material. One end of each of the metallic strips is reverse turned as at 142 which serves to prevent scratching of the film emulsion during passage of the film from the cartridge. The other ends of the metallic strips are bent in an abrupt reverse curl and are positioned within spring receiving slots 144 located in the rear wall 122 of the cover. Adjacent the spring receiving slots 144 in each side wall of the cover are hinge holes 160 which mate with the hinge pins 110 on the base 76 to pivotally secure the cover 74 to the base 76. The hinge so formed permits the cartridge 44 to be conveniently opened for changing the film strips, and locking notches 108 cooperating with a crossbar 104 on the wall 100 insure against accidental opening.

Rotatably supported within the cover 74 and serving to drive the film strip through the cartridge is a film drive spool 162. The reduced ends of the film drive spool 162 are journalled within apertures 164 cut in the side walls 120 of the cover 74. The film drive spool 162 includes a central hub 166 and a pair of parallel spaced apart sprocket flanges 168 at either end. Each of the sprocket flanges 168 carries a plurality of sprocket teeth 170 which are spaced for engagement with the sprocket holes provided along the margins of the film strip. The sprocket teeth 170 are so aligned with the sprocket guides 102, as previously described, as the film passes through the cartridge the margin of the film rides along the sprocket guides 102 and insures that the sprocket teeth 170 adequately engage the film strip. The internal portion of the hub 166 is hollow to define a splined receiver 174 for engagement with the frame advance means 58, as will be described in detail hereinafter. Mounted upon the front wall 124 within the cover and adjacent the film drive spool 162 are a pair of film spool guides 176 which prevent the film from improperly threading about the drive spool 162. This condition could occur as a natural result of the curl of the emulsion on the film strip itself. Similarly, a guide strap 178 is secured between the film spool guides 176 to insure that the film will feed vertically from the cartridge rather than follow its natural curl.

THE PROJECTOR

Figure 7:
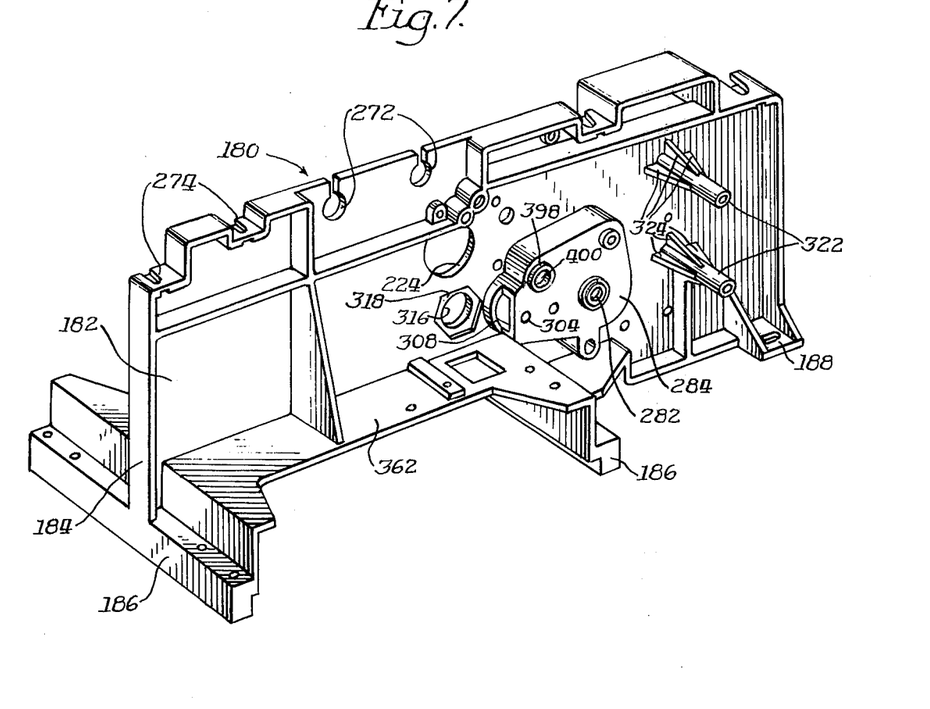
FIG. 7 is a rear perspective view of the molded chassis for the film strip projector of the present invention.
Figure 8:
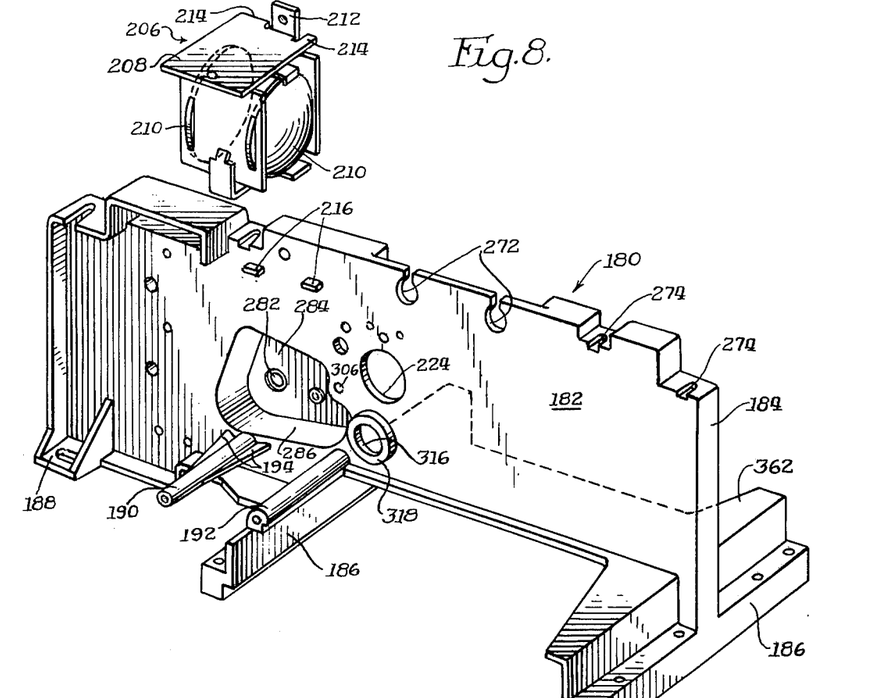
FIG. 8 is a front perspective view of the molded chassis of the present invention, with the optical assembly removed.

A projection system, with the exception of the screen 40 and the second reflecting mirror 62, is mounted substantially within the base 38 of the projector 30. The operative, mechanical components of the projection system are mounted on a single, unitarily molded chassis, generally designated 180, shown in FIGS. 7 through 10. The chassis 180 may be manufactured by a die casting type operation or other suitable method. Details of the molded chassis are explained hereinafter with reference to FIGS. 7 and 8. The chassis 180 includes a generally vertical main mounting web 182. The mounting web is substantially circumscribed by a strengthening flange 184 about the perimeter and formed integrally with a pair of horizontal rails 186 and a smaller rail 188 as seen at the left in FIG. 8. The rails 186 and 188 mount the chassis 180 within the base 38 of the projector. Extending forwardly of the web 182 are two mounting posts 190 and 192. The post 190 includes three support fins 194 while the post 192 is formed adjacent one of the rails 186. The operative components mounted thereon include the framing means 48, the film drive means 58, and an image producing light system, generally designated 202 (FIG. 9).

Figure 9:
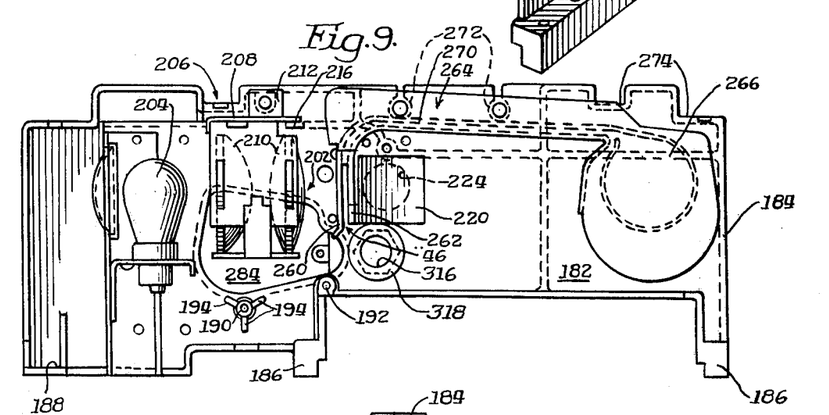
FIG. 9 is a front elevational view of the molded chassis of FIG. 8 with the optics in place.
Figure 10:
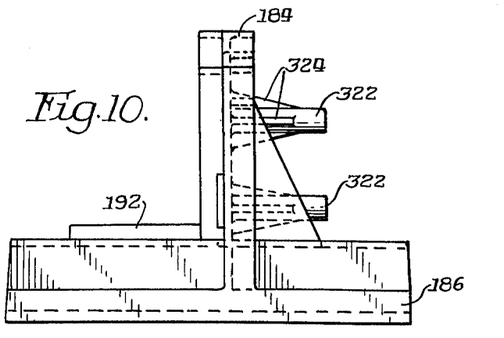
FIG. 10 is a right elevational view of the molded chassis of the present invention.

The light system comprises a bulb 204 which is mounted on the flange 182 adjacent a condensor lens assembly, generally designated 206 (FIG. 9). The condensor lens assembly 206 is removably mounted to the chassis 180 so that it can be easily removed for cleaning. The assembly 206 incudes a four-sided frame 208 which mounts two, generally convex lenses 210. One wall of the frame 208 includes an upwardly extending tab 212 for attachment to the flange 182 by an easily removable screw. The top wall of the frame 208 includes two rearwardly extending tabs 214 which engage a pair of spaced apart horizontally and forwardly extending bosses 216 formed on the flange 182 to insure proper alignment of the lenses 210. The lens assembly 206 is disposed adjacent the aperture 46 and directs a beam of white light through the aperture and thus through the frame of the film strip disposed therein. The light image is then reflected by a light mirror 220 which is mounted on the flange 182 at a 45° angle therewith to reflect the image through a lens 222 (FIG. 2). The lens 222 is mounted within a lens aperture 224 formed in the flange 182. The image is then reflected by the first reflecting mirror 60, which is mounted upon a mirror support stand 226 secured, to the chassis 180. The image reflected by the first mirror 60 is passed to the second reflecting mirror 62 which is supported between adjacent cover wall subtending the included angle and directed therefrom onto the rear of the screen 40.

THE AUDIO SYSTEM

Referring to FIGS. 1 and 2, as previously described, the tape recorder 42 is slidably mounted on the guide rails 66 so that it may be moved outwardly for insertion of the cartridge 44 and returned for feeding the film strip to the projection system. As previously described, the lower portion of the cartridge 44 carries an audio tape cassette 84, which is received by the recorder in a conventional manner. An interlocking system is provided to retain the recorder in the position as shown in FIG. 1 to prevent withdrawing of the recorder when the film strip remains in the projection system. It is not necessary, with the aspects of the contemplated invention, to describe the working components of the interlock, but suffice it to say that the interlock actuating button 68 can be depressed to release the recorder for forward movement only when the film strip has been completely withdrawn into the cartridge 44.

Referring to FIG. 2, the recorder 42 is connected to a generally conventional control circuit by a single, multicontact jack 230 which plugs into the rear of the recorder 42 for transmitting all of the necessary signals from the recorder to the control circuit and vice versa. A retaining strap 234 is fastened to a stud 236 on the interior of the base portion 38 and the bottom of the recorder 42, to prevent accidental complete removal of the recorder from the base 38 which would cause the jack 230 to become unplugged and possibly damage the control circuit. The control circuitry is of a conventional type wherein a signal from the audio tape causes the film drive 58 to advance the film strip one frame after each audio message, related to a particular frame, has terminated. The circuitry also includes an automatic stopping feature which is actuated by a different signal on the audio tape which thereby completely shuts down the operation of the projector 30 and prevents advancement of the film, for example when used in an instructional environment where a question or series of questions is desired to be presented to the user and to allow him time to provide written or oral answers. When using the "auto-stop" feature, it is necessary that the user reactivate the system after he has prepared his answer.

Figure 15:
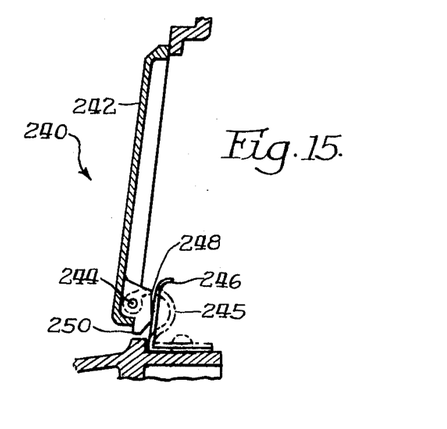
FIG. 15 is a vertical section, on an enlarged scale, of the film cartridge cover door as seen in FIG. 2.

In previous film strip projectors, the large opening in the front of the projector required for insertion of the film strip cartridge 44 provided an unpleasant and unattractive device. The present invention contemplates a covering door, generally designated 240 which aesthetically disguises the above described opening. Referring to FIG. 15, the door 240 includes a generally flat, rectangular plate 242 which is pivotally mounted to the top of the recorder rearwardly of the control buttons 56. A hinge is provided by a pivot pin 244 which is supported on the recorder by a mounting bracket 245 and passed through hinge holes provided in the door 242. A retaining spring 246 is mounted on the recorder rearwardly of the hinge pin 244 to engage a flat surface 248 of the door and maintain the door in a closed position. A small cam 250 will engage the retaining spring as the door 242 is opened. In FIGS. 1 and 2, the door is shown in full lines in the closed position, and the open position is shown in phantom in FIG. 2 providing access to the film strip cartridge 44.

THE FILM GUIDE

After the cartridge is positioned in the projector, the film is moved by the framing means 48 between a pair of spaced, parallel operative plates 260 and 262 mounted on the chassis 180 which define the projection aperture 46. The film, due to the natural curl of the emulsion, is urged into position between the plates during manual operation of the framing means 48, as will be described below.

During projection, the film is advanced through a film chute 264 and then into a storage retainer 266. The film chute 264 comprises a pair of slotted rails 270 which are positioned to receive the film passing between the aperture plates 260 and 262. The rails are mounted on the chassis 180 in a pair of adjacent keyhole slots 272. The film retainer 266 is mounted on the chassis 180 by a pair of flats 274 provided therefore and provides an internal cavity in which the film can curl into a spiral, due to the natural curling force of the emulsion, where it will be maintained in a coiled condition.

FRAMING MEANS

As previously mentioned, a normal characteristic of a film strip is that the development criteria are now well established and the location of the sprocket hole perforations along the film margin has no predetermined relationship with respect to the position of the frames or images on the film. Therefore, prior to automatic advancement of the film by the film drive means 58, the first frame of the film must be properly positioned with respect to the projection aperture 46. The configuration of the sprocket wheel 152, and the station of the sprocket teeth 170 thereafter, accurately index the film strip a single frame for each one-quarter or 90° revolution of the sprocket 162. Thus, as will be described in detail hereinafter, the film drive means 58 will rotate the sprocket 162 exactly 90° for each increment, or one frame, passage of the film through the aperture 46.

Referring to FIGS. 11 through 14, and particularly FIG. 11, the selectively operable framing means includes the manually operable knob 50 which extends through the front of the base 38 for easy access to the user. The framing knob 50 is secured to a framing rod 280 which is journalled within an aperture 282. The journal 282 is provided in the rearward face 284 of a generally hollow boss 286 formed integrally with the chassis 180. Adjacent the inner end of the framing rod 280 is a selectively engageable coupling in the form of a straight tooth positive clutch generally designated 290, including a tooth driver 292 and a slotted receiver 294. The driver 292 is secured to the framing rod 280 and the slotted receiver 294 is rotatably supported by a bushing 296 through which the rod 280 is rotatably journalled. A drive gear 300 is mounted on the slotted receiver 294 in meshing engagement with an idler gear 302. The idler gear 302 is journalled within an aperture 304 formed in the rearward wall of the hollow boss 286 and a second aligned aperture 306 formed in a tab on the web 182. A cut-out 308 is provided in the side wall of the boss 286 to provide clearance for the idler gear 302 to engage a framing gear 310. The idler gear 302 is in meshing engagement with the framing gear 310 secured by a set screw 312 to an output drive shaft 314. The drive shaft 314 is journalled within an aperture 316 formed in the chassis 180 by means of a sleeve bearing 318. The drive shaft 314 also is journalled at its rearwardmost end in a motor mounting plate 320 which is mounted to the chassis 180 on a pair of rearwardly directing studs 322. The studs 322 each include four fin-shaped support flanges 324 for added strength and rigidity.

The forwardmost portion of the drive shaft 314 carries a tapered clutch member 328 for engagement with the splined portion of the cartridge film spool 162. The clutch member 328 includes an elongated spline 330 for engagement with the spool 162. The clutch member 328 is movable within a splined portion 332 of the drive shaft and is biased forwardly by a spring 334 to insure positive engagement with the film spool 162, as previously described.

Rotatably mounted on the drive shaft 314 rearwardly of the framing gear 310 is a drive gear 340 for the film drive means 58. Positioned between the drive gear 340 and the framing gear 310 is a bowed spring washer 342 which gently urges the driving gear away from the frame gear 310. The drive gear 340 includes a rearwardly extending shaft portion 344 which terminates in an enlarged circular flange 346. A clutch 348 is wrapped about the drive shaft 314 rearwardly of the flange 346 and engages a thrust washer 350 against a bushing 352 which mounts the rearward end of the drive shaft 340 in the plate 320. The mating surfaces between the drive gear 340 and the framing gear 310 each include a ring gear 354 and 356, respectively. The clutch spring 348 constantly urges the ring gear 354 of the drive gear 340 into engagement with the ring gear 356 of the framing gear to assure that the drive gear 340 rotates the framing gear 310 during normal operations, as will be described with respect to the drive means 58. However, during initial framing operation, it is desirable to disengage the respective ring gears 354 and 356 so that the drive shaft 314 may be rotated independently of the film drive means 58. This is accomplished by the use of a clutch lever 360 which is pivotally secured to a stud 361 mounted on a horizontal flange 362 provided on the bottom of the chassis 180. The clutch lever 360 includes a vertically upstanding flange 364 for engagement with the circular flange 346 of the drive gear 340. The clutch lever extends horizontally to the left, as seen in FIG. 11, to engage the rearward end 366 of the framing rod 280.

Pushing inwardly on the framing knob 50 pivots the clutch arm 360 clockwise, as viewed in FIG. 11, which engages the flange 346, thereby releasing or disengaging the respective ring gears 354 and 356 between the gears 310 and 340. The framing gear 310 and the drive gear 340 then are free to rotate independently.

In use, the framing knob 50 is pushed into the base of the projector 30 and the straight tooth positive clutch 290 is engaged. Simultaneously, the clutch arm 360 is rotated about its pivot in a clockwise direction releasing the driving engagement between the drive gear 340 and the framing gear 310. Rotation of the knob 50 in its depressed position rotates the gear 300, and thus the idler gear 302 which in turn rotates the framing gear 310. The driving clutch member 328 rotates with the framing gear 310 and, since framing gear 310 is engaged with the film spool 162, the film can be selectively advanced. The film strip is then driven between the operative plates 260 and 262 until the desired image is properly framed.

THE FILM DRIVE MEANS

Figure 12:
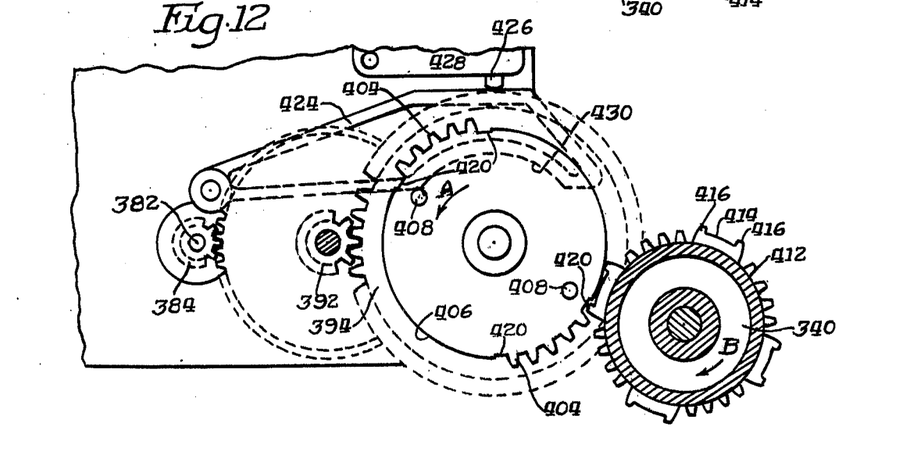
FIG. 12 is a vertical section taken generally along the line 12—12 of FIG. 11, showing the film drive means of the present invention in a position prior to driving engagement.
Figure 13:
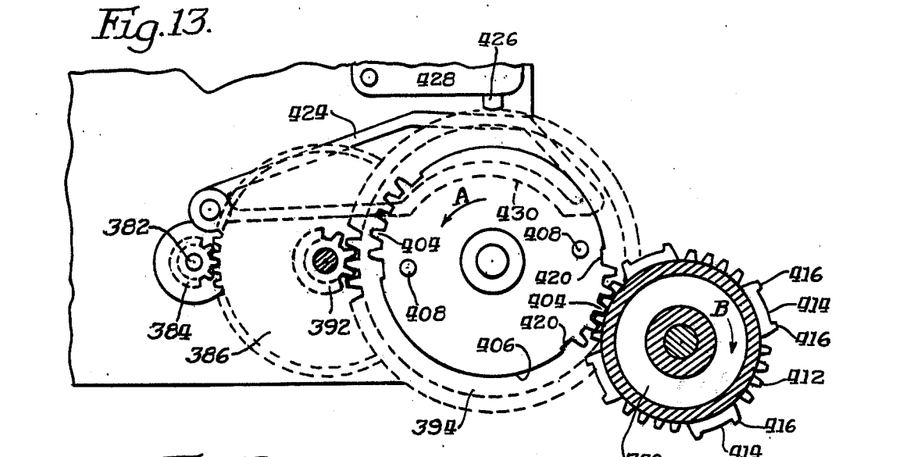
FIG. 13 is a vertical section taken generally along the line 12—12 of FIG. 11, showing drive means of the present invention in a position during driving engagement.
Figure 14:
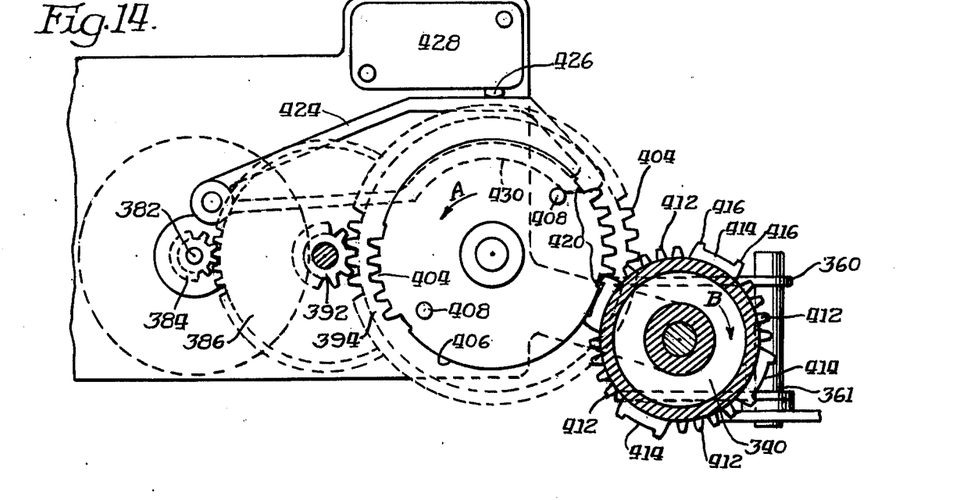
FIG. 14 is a vertical section taken generally along the line 12—12 of FIG. 11 showing the film drive means in a position after driving engagement has been completed.

The film drive means is particularly illustrated in three positions in FIGS. 12, 13 and 14 and also shown in plan view in FIG. 11. The drive means is powered by a reversible, DC motor 380 (FIG. 14) which is mounted on the motor plate 320. A motor shaft 382 extends through the plate 320 and carries a small pinion gear 384 for driving the film drive means 58.

Generally, the film drive means 58 is a Geneva type drive wherein the continued rotational output of the drive motor 380 is transformed into a sequence of 90° rotational movements of the output drive shaft 314. More particularly, the drive means 58 includes a first stepdown gear 386 which is journalled in a bushing 388 mounted in an aperture 390 formed in the boss 284. The stepdown gear is in meshing engagement with the pinion gear 382 and itself carries a smaller pinion gear 392 for engagement with an index-lock gear 394. The index-lock gear 394 likewise is journalled in a bushing 398 mounted within an aperture 400 also formed on the boss surface 284. The index-lock gear 394 includes a complete gear portion for engagement with the pinion gear 392 and forwardly thereof, on a smaller diameter, a partial gear having only two gearing portions 404 on opposite sides of the rotational axis (FIG. 12). The remainder of the gear is a toothless cylindrical surface 406 having a diameter approximately equal to the depth of the gear teeth 404. Two rearwardly directed index control posts 408 are mounted on the rearward side of the index-lock gear 394 for deenergizing the drive motor 380, as will be described below.

The index-lock gear 394 and particularly the partial gear portions 404 engage and rotate the drive gear 340. More particularly, the drive gear 340 (FIGS. 12 through 14) includes four identical sectors. Each sector includes a plurality of gear teeth 412 for engagement with the gear teeth 404 of the index-lock gear. A toothless cam locking means 414 is provided between each set of gear teeth 412. Each cam includes two spaced apart nipples 416. The nipples 416 have a cylindrical surface which is substantially identical in diameter to the cylindrical surface 406. When the teeth 412 are not in engagement with the teeth 404, the cylindrical surfaces 406 and 416 are in sliding engagement as seen in FIG. 12. As the drive motor is energized, by the control circuitry which receives a signal from the audio tape, the index-lock gear 394 rotates in a counterclockwise direction, as shown by arrow A in FIGS. 12, 13 and 14. A spacing notch 420 is provided on the index-lock gear adjacent the first and last tooth 404 to provide a clearance path for the nipples 416 as the gears simultaneously rotate.

FIG. 12 shows the gear 294 rotating just prior to engagement of the teeth 404 with the teeth 412. Continued rotation of the index-lock gear 394 causes the teeth 404 and 412 to mesh and thereby causes the drive gear 340 to rotate in a clockwise direction, as shown by arrow B in FIG. 13. Continued rotation thereafter causes the teeth 404 and 412 to disengage and the subsequent cam 414 and respective nipples 416 to engage the cylindrical surface 406 on the opposite side of the teeth 404. Simultaneously with the engagement of the cam 414 is the engagement of one of the pins 418 with a pivotally mounted deenergization stop lever 424. Contract by the pin 408 raises the lever 424 which contacts a button 426 on a microswitch 428 which thereby deenergizes the motor 380 and energizes a motor braking circuit. The lever 424 is provided with an extended pin engaging surface 430 to permit the pin to be effective during an anticipated amount of motor coasting.

Therefore, the motor is energized by the control circuitry and deenergized immediately after the drive shaft 314 rotates exactly 90°, which moves the next frame into the projection aperture 46. In this manner, after the initial frame has been positioned in the aperture 46, accurate framing is maintained throughout projection of the entire film strip length. After projection of the film, the motor 380 is reversed driving the film drive means 58 in the reverse direction thereby rewinding the film back into the cartridge 44.

The alternate embodiment of the present projector 30 is shown in FIGS. 16 through 20. The alternate embodiment is a portable or collapsible variation of the present invention. In referring to the alternate embodiment, like numerals will indicate the same component in the alternate embodiment. One of the advantages of the alternate embodiment is that the screen 40 and a smaller cover 480 are collapsible.

Figure 16:
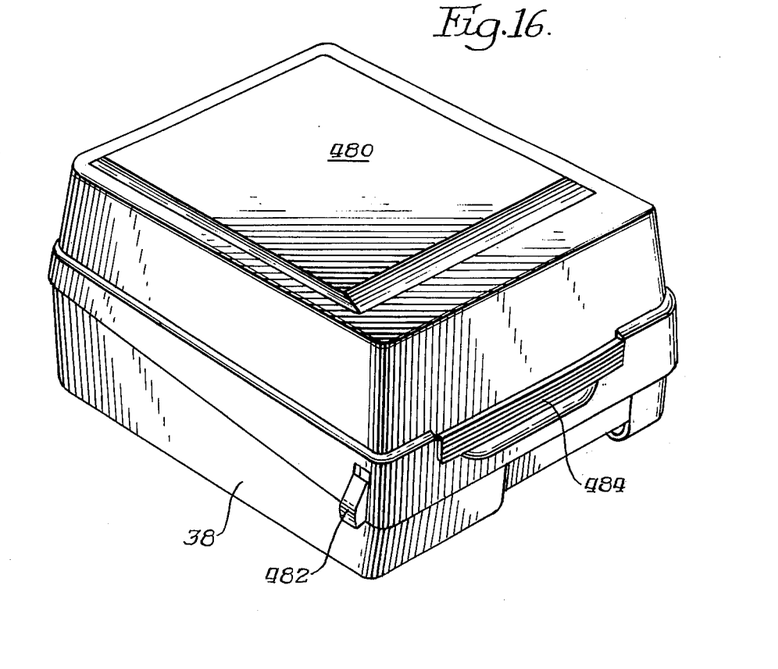
FIG. 16 is a perspective view of an alternate, portable model of the film strip projector of the present invention, shown in its closed or portable position.
Figure 17:
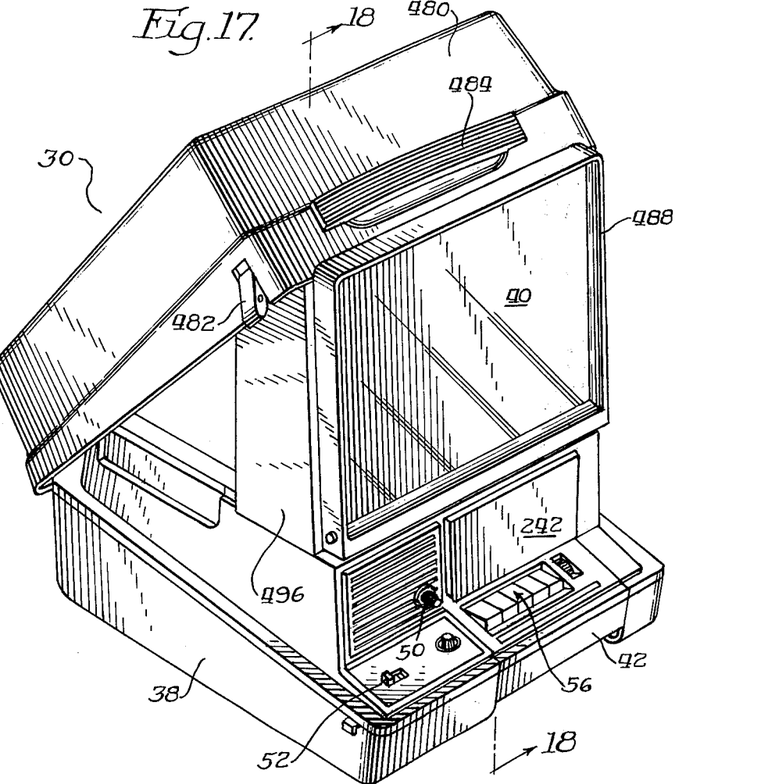
FIG. 17 is a perspective view of the portable model of FIG. 16 shown in its open or operable position.
Figure 18:
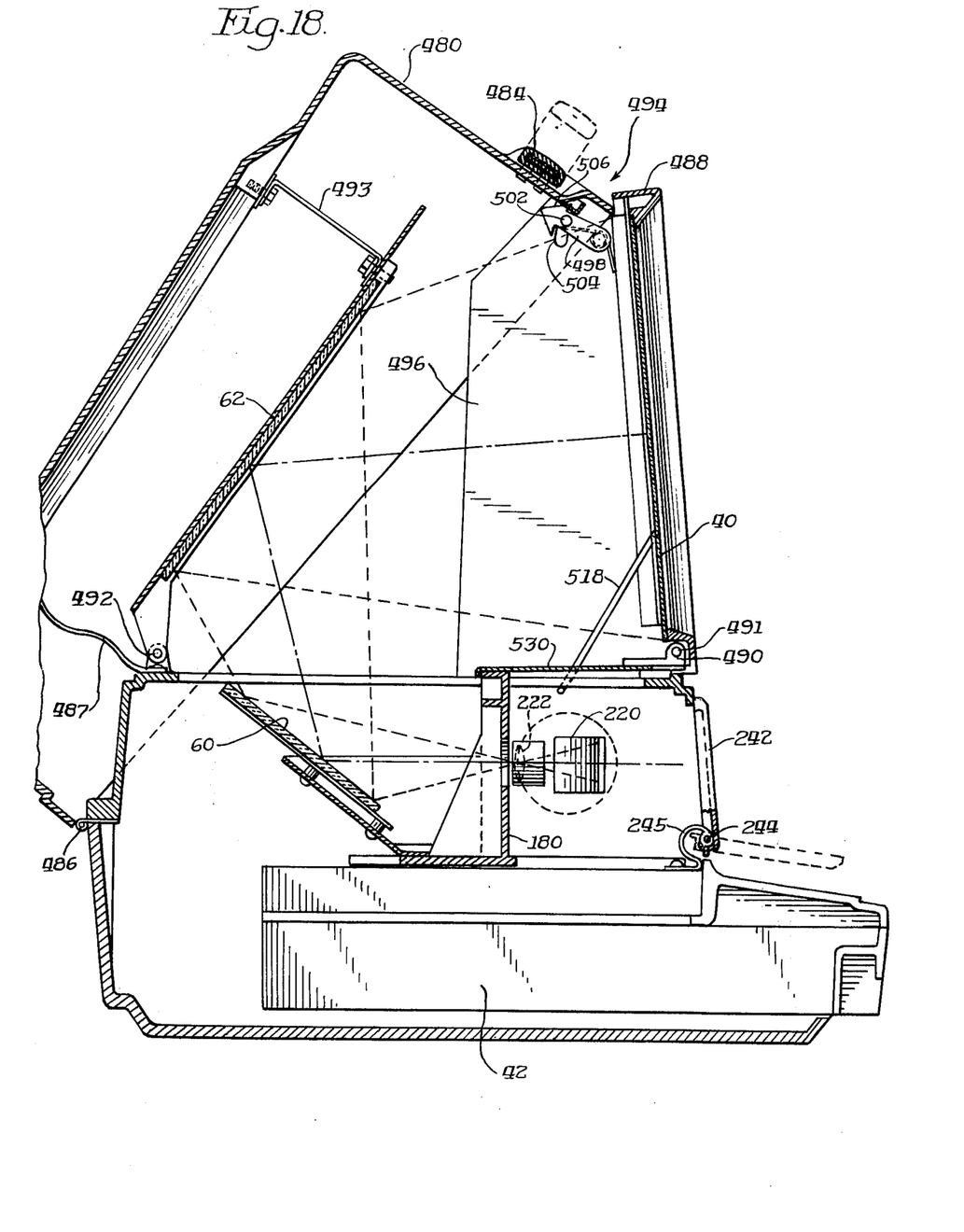
FIG. 18 is a vertical section, on an enlarged scale, of the portable model taken generally along the line 18—18 of FIG. 17.
Figures 19, 20:
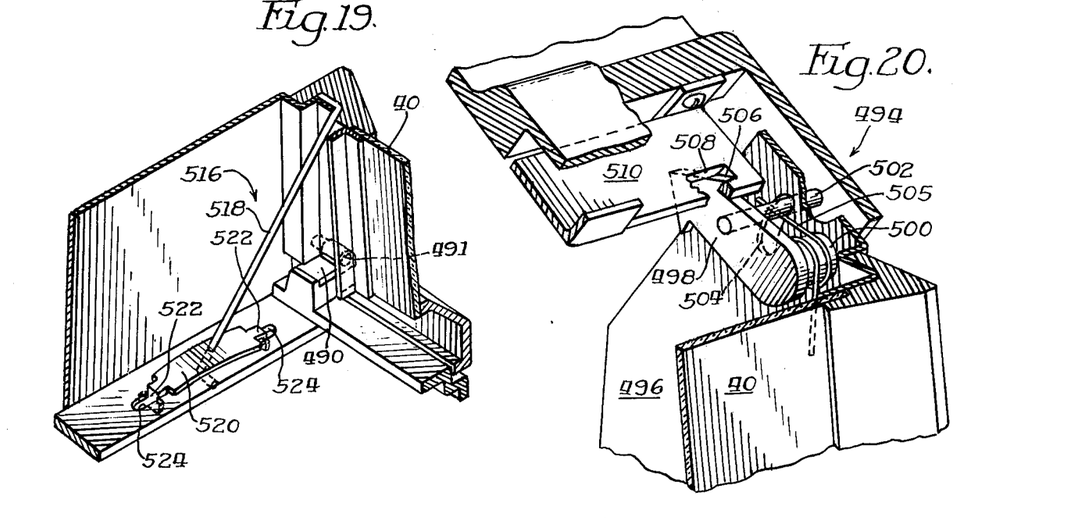
FIG. 19 is a fragmentary, perspective view, showing the screen braking means for the collapsible screen of the portable model of the present invention.
FIG. 20 is a fragmentary perspective view, showing the screen latch locking means of the portable model of the present invention.

Referring to FIG. 16, the cover 480 includes a pair of latches 482 for securing the front of the cover to the base 38. A flexible handle 484 is mounted to the cover to provide for a convenient carrying handle. The cover is shown collapsed or closed in FIG. 16 and in the open position in FIG. 17. Referring to FIG. 18, the cover is pivotally connected by a hinge 486 at the rear of the base for opening and closing. A flexible strap 487 connected between the cover and the rear of the base prevents excessive backward movement of the cover as it is opened. The screen 40 is mounted within a frame 488 which is pivotally mounted by a hinge 490 and hinge pin 491 to the front of the base 38. To open the portable model for use, the cover is lifted and then the screen is pivoted to a general vertical orientation, as seen in FIG. 17, and secured to the cover by a locking means, generally designated 494 (FIG. 20). The second reflecting mirror 62 also is pivotally mounted to the base by a hinge 492 to permit movement for folding. The uppermost edge of the mirror 62 is connected to the cover 480 by a flexible strap 493 so that during closure the cover 480 may rotate through a larger angle than is required for the mirror 62. In the "open" position the strap 493 maintains the mirror 62 at the correct angle to reflect the image onto the screen 40.

The screen frame 488 includes two partial side walls 496 which extend rearwardly when the screen is in the upright position and overlap a portion of the base when in the closed position. The locking means 494 includes a pivotally mounted, pointed or arrow shaped, lever 498 which is pivotally mounted by a pin 500 to each side wall 496 in the topmost corners thereof. The pointed member includes an actuating pin 502 which extends through an arcuate slot 504 in the side walls 496.

A coil spring 505 is wrapped around the pivot pin 500 and has a leg extending downwardly to engage a portion of the screen 40, with the other leg extending rearwardly to engage the actuating pin 502. The spring 505 constantly urges the lever 498 upwardly and when the cover 480 is lowered downwardly onto the screen 488, one of a pair of hook-shaped surfaces 506 engage a generally rectangular slot 508 formed in a bracket 510 mounted in the cover 480. When the cover is locked in position, as shown in FIGS. 18 and 20, the handle can be conveniently grasped for transporting the portable model when the open position. The handle is positioned so that the center of gravity of the components in the base, as previously described, of the portable model lies approximately directly under the handle when in the open position so that the device can be conveniently carried without tipping or collapsing.

When it is desired to close the cover of the portable model for storage, or the like, the locking means 494 are disengaged and the screen and cover folded to the closed position, as seen in FIG. 16. However, to prevent damage, particularly to the screen, and the other operative components, a projection screen braking means, generally designated 516, is provided to prevent the screen 40 and frame 488 from slamming down. More particularly, the braking means 516 includes a braking rod 518 which is pivotally connected at one end to the frame 488. The braking rod 518 passes through an aperture formed in a resilient braking element 520 and down into the base 38. The braking element 520 is formed of plastic or other resiliently flexible material an includes a T-shaped tab 522 on either end for engagement within a pair of slots 524 formed in the base. As the screen 40 is lowered, the braking rod 518 passes through the aperture and rotates with respect to the plastic braking element 520 to cause an increased amount of friction to be developed as the screen is lowered due to the flexing of the braking element 520 to accommodate the travel of the rod 518. This friction force will support the screen in virtually any angular position and therefore prevents damage to the projector 30.

The portable model also includes an additional feature which prevents light from the lightbulb 204 from interfering with the image. Referring to FIG. 18, the screen is tilted about 5 degrees rearwardly about a vertical axis. Therefore, a pivotally mounted light shield 530 is provided to prevent any light, from the bulb 204, from hitting the screen 40 and thereby blurring or distorting the image. More particularly, referring to FIG. 18, the light shield 530 includes a generally flat plate which is pivotally mounted on the hinge pin 491 which is common with the hinge 490 that mounts the screen 40. In this manner, the lightbulb can easily be changed by pivoting the light shield upwardly and all stray light rays from the bulb are prevented from impinging the screen 40.

The foregoing detailed description has been given for clearness of understanding only and no unnecessary limitations should be understood therefrom as some modifications will be obvious to those skilled in the art.

We claim:

1. An intermittent rotary motion device, comprising:
   a rotatable drive gear having at least one segmental arcuate toothed portion with gear teeth thereabout, and a cylindrical surface about the remaining periphery of the drive gear and a detent formed in the cylindrical surface adjacent each end of the segmented arcuate toothed portion, said detents protruding radially inwardly a greater distance than the root diameter of the toothed portions;
   drive means drivingly connected to said drive gear;
   a driven gear including a plurality of arcuate toothed portions each of which is spaced apart by a cam locking means for engagement with the cylindrical surface of said drive gear to provide sliding lost motion therebetween, said cam locking means including a pair of spaced apart arcuate tip portions for engaging the cylindrical surface of the drive gear, the engaging tip portions protruding radially outwardly a greater distance than the gear teeth on the toothed portions of the driven gear so as to mesh and engage the detents of said drive gear adjacent the toothed portions thereof, whereby continued rotation of the drive gear by the drive means causes the toothed portion of said drive gear to sequentially engage one of the toothed portions of said driven gear to cause rotation thereof through an angle determined by the length of the toothed portions thereof whereafter the next adjacent cam locking means engages the cylindrical surface of the drive gear and prevents a rotational movement of the driven gear during the period that the cam locking means engages the drive gear; and
   stop means operatively associated with said drive gear to de-energize and stop the drive means after a predetermined angular rotation thereof, said stop means comprising a pair of protrusions on the drive gear protruding parallel to the axis thereof, switch means to de-energize the drive means, and a pivotally mounted stop lever, having an arcuate cam surface alternately engageable with one of said protrusions during a predetermined angular rotation of said drive gear for movement between a drive position wherein said protrusions are out of engagement with said stop lever and said drive means is energized, and a stop position wherein one of said protrusions engage said arcuate cam surface whereby the stop lever actuates the switch means to de-energize the drive means.

2. The intermittent rotary motion device of claim 1 wherein the driven gear includes four of said cam locking means and four arcuate toothed portions therebetween, and said drive gear includes two of said toothed portions so that said stop means is energized and thereby said drive means is de-energized for every 180° rotation of said drive gear and corresponding 90° rotation of said driven gear.

3. In a film strip projector including a projector aperture for framing the film to be projected and an output drive shaft for driving the film strip through the projector, a film strip drive means, comprising:
   a rotatable drive gear having two segmental arcuate toothed portions on the periphery, clearance means adjacent the end of said toothed portions, said clearance means including a detent formed adjacent each end of the segmented arcuate toothed portions, and a generally cylindrical surface about the remaining periphery of the drive gear;
   drive means connected to said drive gear for rotating the drive gear;
   a driven gear including a plurality of arcuate toothed portions spaced apart by a cam locking means, said cam locking means including a pair of spaced apart protrusions for engaging the cylindrical surface of the drive gear, the engaging protrusions protruding radially outwardly a greater distance than the gear teeth on the toothed portions of the drive gear, said toothed portions engaging the toothed portions of the rotatable drive gear and said protrusions engaging said clearance means for positive movement of the cam locking means into engagement with said cylindrical surface of the drive gear whereby rotation of the drive gear by the drive means causes the toothed portions of said drive gear to sequentially engage one of the toothed portions of said driven gear and cause rotation thereof to a predetermined angle whereafter the protrusions of the next adjacent cam locking means engage the cylindrical surface of the drive gear to prevent rotational movement of the driven gear during the period that the cam locking means engages the cylindrical surface of the drive gear, said driven gear being connected to the film strip output drive shaft to sequentially drive the film strip, frame by frame, through the film strip projector.

4. The film strip projector of claim 3 wherein the output shaft is connected to said drive gear by a manually operable spring biased clutch means so that the output drive shaft is selectively rotatably positionable with respect to said driven gear whereby said film strip may be selectively positioned with respect to the driven gear to permit initial framing of the film strip in a projection aperture whereafter proper indexing of the film strip within the aperture is maintained by the drive means.

5. The intermittent rotary motion device of claim 4 wherein said spring biased clutch means includes an output shaft gear keyed to said film strip projector output shaft, means movably mounting said driven gear for axial movement on said film strip projector output shaft, and biasing means constantly urging said driven gear into frictional engagement with said output shaft gear for conjoint rotation therewith.

6. The film strip projector of claim 5 including stop means operatively associated with said drive gear to deenergize and stop the drive means after a predetermined angular rotation of said driven gear.

7. The film strip projector of claim 6 wherein the stop means comprises at least one protrusion on the drive gear and switch means activated by said protrusion to thereby de-energize and stop the drive means.

8. The film strip projector of claim 7 including a pivotally mounted stop lever, having an arcuate guide surface, engageable by said protrusion for movement between a drive position wherein said post is out of engagement with said lever and said motor is energized and a stop position wherein said post engages said arcuate guide surface whereby the stop lever actuates the switch means to de-energize the drive means.

9. The film strip projector of claim 7 wherein the driven gear includes four of said cam locking means and four arcuate toothed portions therebetween, and said drive gear includes two of said toothed portions and two of said protrusions so that said stop means is energized and thereby said drive means is de-energized for every 180° rotation of said drive gear and corresponding 90° rotation of said driven gear.

10. An intermittent rotary motion device, comprising:
a rotatable drive gear having at least one segmental arcuate toothed portion about its periphery, a cylindrical surface substantially about the remaining periphery of the gear and a detent formed in the cylindrical surface adjacent each end of the segmental arcuate toothed portion, said detents protruding radially inwardly a greater distance than the root diameter of the toothed portion;

drive means drivingly connected to said drive gear; and a driven gear including a plurality of arcuate toothed portions each of which is spaced apart by a cam locking means for engagement with the cylindrical surface of said drive gear to provide lost motion therebetween, said cam locking means including a pair of spaced apart arcuate tip portions for engaging the cylindrical surface of the drive gear, the engaging tip portions protruding radially outwardly a greater distance than the gear teeth on the toothed portions of the driven gear so as to mesh and engage the detents of said drive gear adjacent the toothed portion thereof, whereby continued rotation of the drive gear by the drive means causes the toothed portion of the drive gear to sequentially engage one of the toothed portions of said driven gear to cause rotation thereof through an angle determined by the length of the toothed portions thereof whereafter the arcuate tip portions of the next adjacent cam locking means are driven by the detent to engage the cylindrical surface of the drive gear and prevent rotational movement of the driven gear through the period that the cam locking means engages the drive gear.

11. The intermittent rotary motion device of claim 10 wherein the driven gear is connected to a film strip projector output drive shaft by a manually operable spring biased clutch means so that the film strip projector output shaft is selectively rotatably positionable with respect to said driven gear whereby said film strip may be selectively positioned with respect to said driven gear to permit initial framing of the film strip in a projector aperture whereafter proper indexing is maintained by the rotary motion device.

12. The intermittent rotary motion device of claim 11 wherein said spring biased clutch means includes an output shaft gear keyed to said film strip projector output shaft, means movably mounting said driven gear for axial movement on said film strip projector output shaft, and biasing means constantly urging said driven gear into frictional engagement with said output shaft gear for conjoint rotation therewith.

* * * * *